US007913378B2

(12) United States Patent
Hoffmann et al.

(10) Patent No.: US 7,913,378 B2
(45) Date of Patent: Mar. 29, 2011

(54) WIRE STITCHER HAVING A STITCHING HEAD FOR PROCESSING ANNULAR-EYELET STAPLES

(75) Inventors: Steffen Hoffmann, Leipzig (DE); Holger Klamt, Leipzig (DE); Siegmar Tischer, Borsdorf (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 1039 days.

(21) Appl. No.: 11/726,682

(22) Filed: Mar. 22, 2007

(65) Prior Publication Data

US 2007/0220730 A1 Sep. 27, 2007

(30) Foreign Application Priority Data

Mar. 22, 2006 (DE) ........................ 10 2006 013 171

(51) Int. Cl.
*B23P 21/00* (2006.01)
*B25C 5/08* (2006.01)

(52) U.S. Cl. ........................................... 29/716; 227/89

(58) Field of Classification Search .................... 29/798, 29/432, 525.01, 525.05, 432.1, 715, 716, 29/717, 714, 700; 227/89, 82, 87, 88, 92, 227/51, 90, 155

See application file for complete search history.

(56) References Cited

U.S. PATENT DOCUMENTS

| | | | | |
|---|---|---|---|---|
| 4,505,415 | A | 3/1985 | Gruen | |
| 5,098,002 | A | 3/1992 | Hänsch et al. | |
| 6,164,513 | A | 12/2000 | Yoshie | |
| 6,655,674 | B2 | 12/2003 | Müller | |
| 7,337,937 | B2 * | 3/2008 | Klamt et al. | 227/89 |
| 2007/0075110 | A1 * | 4/2007 | Klamt et al. | 227/51 |

FOREIGN PATENT DOCUMENTS

| | | | |
|---|---|---|---|
| CH | 549 443 | | 5/1974 |
| DE | 44 34 513 | C1 | 8/1995 |
| EP | 0 104 076 | A2 | 3/1984 |
| EP | 0 399 322 | A2 | 11/1990 |
| EP | 0 968 798 | A2 | 1/2000 |
| EP | 1 245 406 | A1 | 10/2002 |

* cited by examiner

*Primary Examiner* — John C Hong

(74) *Attorney, Agent, or Firm* — Laurence A. Greenberg; Werner H. Stemer; Ralph E. Locher

(57) ABSTRACT

A stitching method and a wire stitcher having a stitching head for stitching sheet-like materials using annular-eyelet staples, includes a staple support with a supporting body in the stitching head. The staple support supports a region of the annular eyelet during a driving-in operation and is moved out of the annular eyelet only when legs of the staple passing through the sheet-like material, have been largely bent over.

9 Claims, 9 Drawing Sheets

WIRE STITCHER HAVING A STITCHING HEAD FOR PROCESSING ANNULAR-EYELET STAPLES

CROSS-REFERENCE TO RELATED APPLICATION

This application claims the priority, under 35 U.S.C. §119, of German Patent Application DE 10 2006 013 171.1, filed Mar. 22, 2006; the prior application is herewith incorporated by reference in its entirety.

BACKGROUND OF THE INVENTION

Field of the Invention

The invention relates to a method of stitching sheet-like materials with annular-eyelet staples. The invention also relates to a wire stitcher having a stitching head for processing annular-eyelet staples.

Various constructions of apparatuses for stitching folded signatures and printed products are used, with different production rates, for finishing purposes in the printing industry. Examples of commonly used apparatuses are so-called "gang stitchers", which separate folded printed products in such a way that they deposit them, for example, on a transporting chain or the like, collect and collate them and then feed them to a stitching station and subsequently, if appropriate, to a finishing unit for edge-trimming purposes, to a delivery device or the like. Such a gang stitcher is described, for example, in European Patent EP 0 916 514 B1.

The known gang stitcher has a stitching station in which folded sheets located one upon the other are stitched with aid of a staple, in particular of a wire staple. For that purpose, use is made of stitching heads, which are disposed above the collecting chain, and so-called "clinchers", which are disposed between the collecting chains in place of a guide strip and bend over free ends of the staples forced through the folded sheets. Stitching stations and stitching heads for that purpose are also known, for example, from German Patent DE 44 44 220, corresponding to U.S. Pat. No. 5,516,024, and German Published, Non-Prosecuted Patent Application DE 197 12 876, corresponding to U.S. Pat. No. 6,119,911.

If such a wire stitcher is to use annular-eyelet staples, instead of straightforward wire staples, for stitching the stacked printed products, the stitching head of the apparatus is either converted or exchanged for one with components adapted to the geometry of the annular-eyelet staples or being capable of bending the stitching wire, which is fed from a wire roll, into the geometry of an annular-eyelet staple. Such a stitching head is provided, for example, by the form Hohner Maschinenbau GmbH, located at 78532 Tuttlingen, Germany, under the name Universal 48/5S. That device can be converted from a stitching head for normal staples to a stitching head for annular eyelets by virtue of exchanging individual subassemblies, such as formers and bending devices.

When annular-eyelet staples are driven into the product which is to be stitched, the staple is supported in the region of the annular eyelet by a staple support projecting into the eyelet. That prevents the eyelet from deforming when it is driven through the product which is to be stitched and the staple legs which have been forced through are bent together. That is important, in particular, when only a few layers of thin paper are being stitched.

However, it is also necessary for the staple support to be drawn back again in good time by way of its supporting body, which protects the eyelet region, in order to ensure that the staple support releases the eyelet in good time, for example when the stitched product is moved on beneath the stitching head. That is usually brought about in such a way that the driver, which encloses the eyelet in the manner of a two-pronged fork and forces the shoulder of the annular-eyelet staple into the product which is to be stitched, reaches, just before the dead center of its stitching movement directed onto the printed product, the beveled end of the staple support by way of its bottom edge, moves along the staple support and forces it out of the staple in the process.

In the case of relatively thick stitching products or stable paper, the staple has then already been driven in to the extent where subsequently bending the staple legs together no longer affects the eyelet geometry, since the paper of the stitching product then supports the staple.

In the case of stitching products made up of only a few sheets of thin paper, the sheets are not able to withstand the transverse forces to which they are subjected by the staple. Rather than being able to support the driven-in staple against lateral yielding, they start to tear. Therefore, during the operation of bending the legs of the staple together, even in the short period of time between the return of the staple support and the closure of the staple, the result may be deformation, in which the eyelet "collapses", as is illustrated in the diagrammatic view according to FIG. 5.

SUMMARY OF THE INVENTION

It is accordingly an object of the invention to provide a stitching method and a wire stitcher having a stitching head for processing annular-eyelet staples, which overcome the hereinafore-mentioned disadvantages of the heretofore-known methods and devices of this general type and which ensure, even when using annular-eyelet staples to stitch products having only a few layers, or thin layers, that the annular eyelet, as far as possible, does not deform.

With the foregoing and other objects in view there is provided, in accordance with the invention, a method of stitching sheet-like materials with annular-eyelet staples. The method comprises pressing a driver onto shoulders of the staples and driving-in the staples into the sheet-like material. An eyelet region of the staples is supported during the driving-in step with a staple support introduced between legs of the staples. The staple support is moved out of the eyelet region only when the legs of the staples passing through the sheet-like material to be stitched have been largely bent over.

With the objects of the invention in view, there is also provided a wire stitcher, comprising a stitching head for stitching sheet-like materials using preferably annular-eyelet staples. The stitching head has a driver pressing onto shoulders of the staples and driving the staples into the sheet-like material. A staple support supports the staples during a driving-in operation. A bending configuration bends over legs of the staples passing through the sheet-like material. A drive moves the staple support out of a region of the staple. The drive is configured and controlled for moving the staple support completely out of the region of the staple or of the annular eyelet, only once the legs of the staples passing through the sheet-like material have been largely bent over.

In accordance with another mode of the invention, the staple support, during its return movement, expediently leaves the supporting region of the annular eyelet only when the staple end of the driver has already passed beyond the bottom end of the staple support. This bottom end is located opposite the sheet-like material.

In accordance with a further mode of the invention, this can be achieved, for example, in such a way that the return movement of the staple support is derived from the movement of the configuration which bends over the staple ends, or is coupled thereto. This coupling, of course, need not necessarily be a mechanical one. It may also be an electric or electronic coupling, with the staple support being driven by a separate drive and the latter moving the staple support out of the region of the annular eyelet when the configuration for bending over the staple ends, which is positioned beneath the stitching product, has executed the bending operation to the extent where there are no longer any harmful transverse forces which may result in deformation in the region of the annular eyelet.

In accordance with a concomitant mode of the invention, the return movement of the staple support out of the region of the annular eyelet is brought about by a control curve or a cam which takes effect for the first time just before the bottom dead center of the stitching movement of the driver.

Other features which are considered as characteristic for the invention are set forth in the appended claims.

Although the invention is illustrated and described herein as embodied in a stitching method and a wire stitcher having a stitching head for processing annular-eyelet staples, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
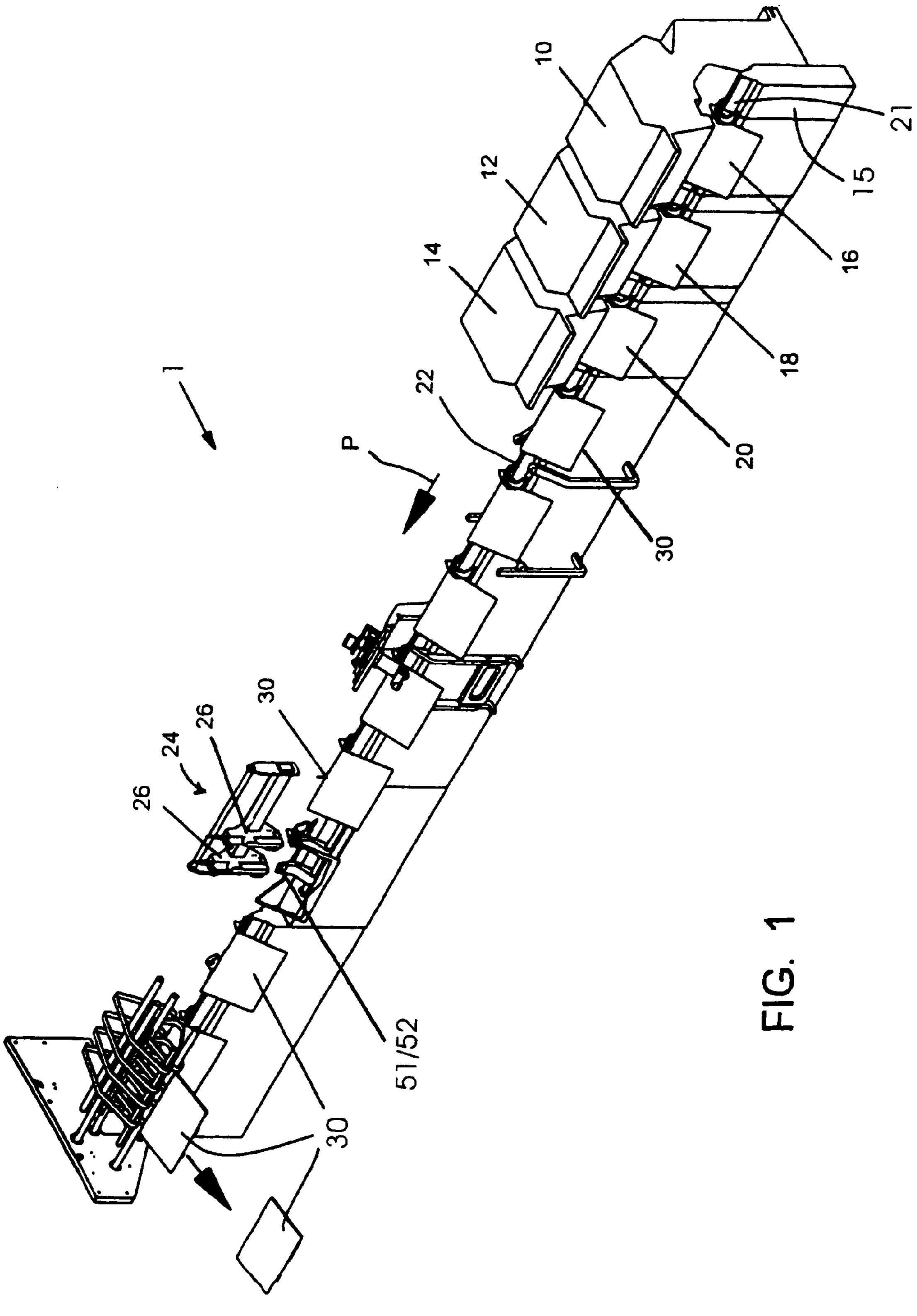
FIG. 1 is a simplified, diagrammatic, perspective view of a gang stitcher with a stitching station.

Referring now to the figures of the drawings in detail and first, particularly, to FIG. 1 thereof, there is seen a typical gang stitcher 1 having a collecting chain 22 as a transporting configuration. Individual folded sheets or folded signatures 16, 18, 20 from stacks in folded-sheet feeders 10, 12, 14 are deposited on this collecting chain. A guide strip 15, which is disposed beneath the collecting chain 22, has an upper portion 21 formed in the manner of a knife edge and a straight line defining a transporting and stitching line. The collecting chain 22, together with the guide strip 15, forms a substantially or approximately roof-shaped rest on which collected folded sheets 30 are transported in a straddling manner, in the direction of an arrow P, to a stitching station 24, in which they are stitched with the aid of staples. For this purpose, use is made of stitching heads 26, which are disposed above the collecting chain, and of pairs of clinchers 51/52, which are disposed therebelow and bend over free ends of the staples forced through the stacks 30 of folded sheets by the stitching heads 26.

Figure 2:
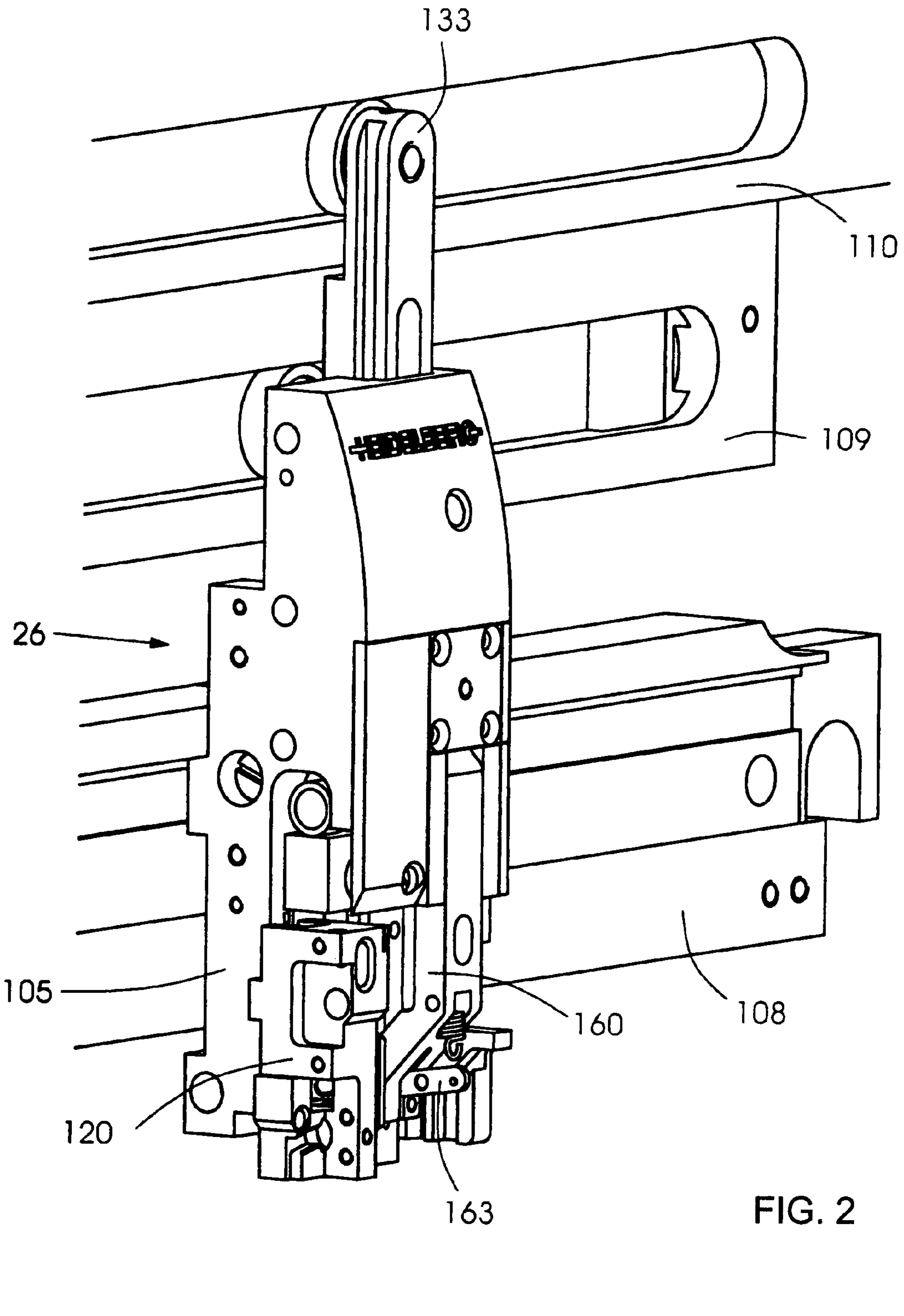
FIG. 2 is an enlarged, fragmentary, perspective view of a stitching head which is guided in the stitching station of the gang stitcher according to FIG. 1.

FIG. 2 illustrates more specifically one of the stitching heads 26 of FIG. 1 in the stitching station 24 of the gang stitcher 1. A basic stitching-head body 105 is fixed to an accommodating rail 108, which executes a horizontal cyclic movement in which the stitching head is brought to a transporting speed of the collected stack 30 of folded sheets which is to be stitched. In addition to the lateral displacement of the accommodating rail 108, a slide 19 (not illustrated in FIG. 2) and a driver slide 133 are moved vertically through grooves in two control rails 109 and 110. The rest of the movements in the wire stitcher are also derived from the relative movement between the driver slide 133 and the slide 19.

Figure 3:
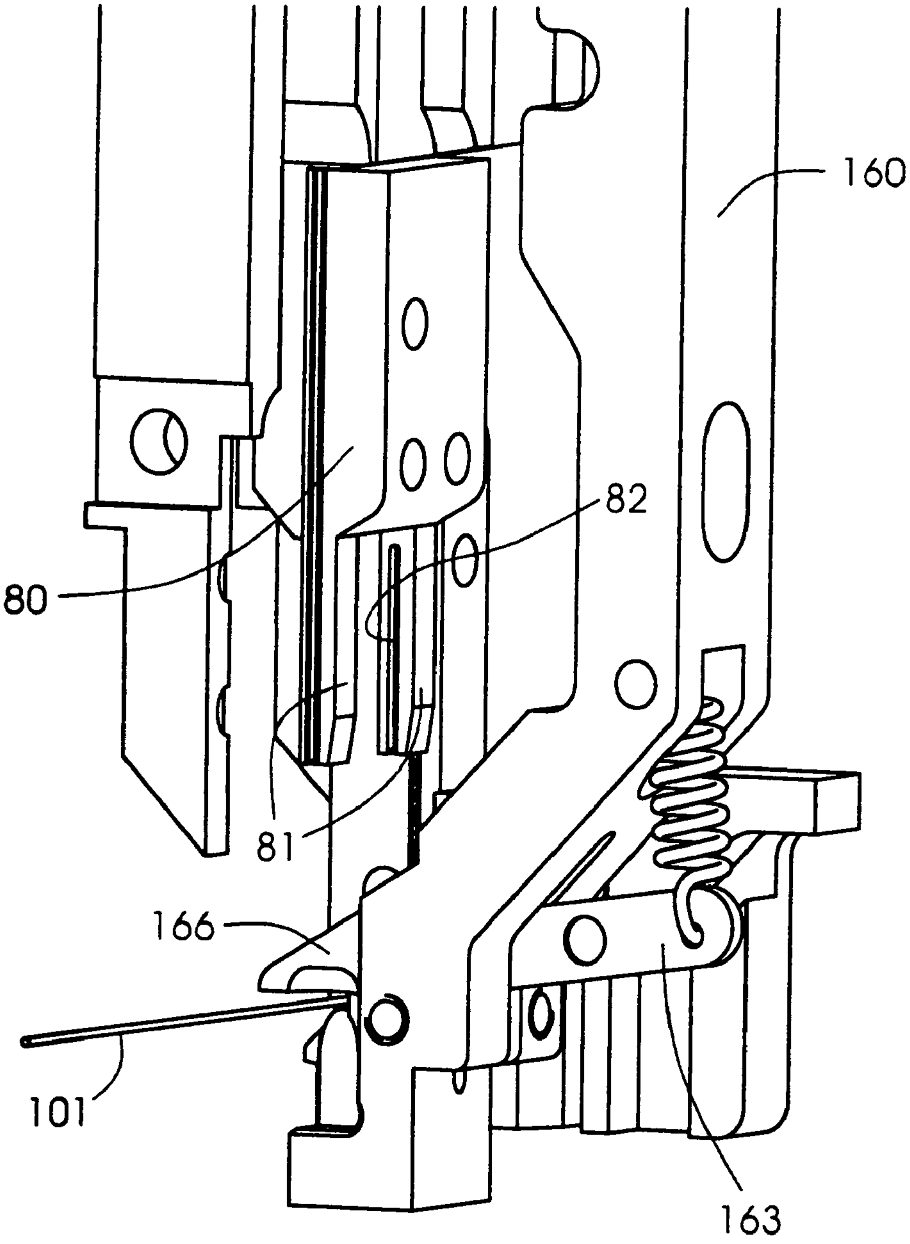
FIG. 3 is a further enlarged, fragmentary, perspective view of a bottom region of the stitching head of FIG. 2.

The basic stitching-head body 105 has a cut-off box 120 disposed thereon, into which a stitching wire 101 (shown in FIG. 3) is introduced and cut off in accordance with the length of wire required. The length of wire required in this case depends, for example, on the thickness of the stack which is to be stitched and on the type of wire stitching, that is to say, for example, using annular eyelets or normal staples. The rest of the text, however, describes the stitching head with its components adapted in geometry to stitching using annular eyelets.

In order to ensure that the cut-off stitching wire 101 does not fall down, the stitching wire is clamped firmly on a former 160 by a clamping jaw 166, which is actuated by a wire-clamping lever 163. The former 160 is cam-controlled in such a way that it pre-forms the cut-off piece of stitching wire 101 into a desired staple shape with open staple legs, that is to say, in the present case, to form an annular eyelet. This pre-formed staple is then driven, through the use of a driver 80, into the stack which is to be stitched, as is explained hereinbelow with reference to FIGS. 4A to 4D.

In order to gain an understanding of further functionings of the stapling head, which will not be described in any greater detail herein, reference is made in full to co-pending U.S. patent application Ser. No. 11/523,342, filed Sep. 19, 2006 and to German Published, Non-Prosecuted Patent Application DE 10 2005 044 707, which are assigned to the assignee of the instant application and are incorporated herein by reference.

A bottom region of the driver 80 has a fork-shaped construction and has two prongs 81, with undersides and insides provided with a groove 82. During a downward movement of the driver, an annular eyelet 3 is gripped by the prongs 81 and accommodated in the groove 82. The two prongs 81 use their underside to force shoulders of an annular-eyelet staple 2 onto the stack of paper sheets which is to be stitched. A staple support 6, which can be rotated about an axis 8 in the slide 19, is disposed behind the driver 80. The staple support 6 has, on both sides, in the region of the prongs 81 of the driver, supporting or control curves or cams 7 which are inclined at an angle relative to these prongs and on which the prongs 81 slide along, by way of their undersides, during the downward movement, which is symbolized by an arrow A and, as is indicated by an arrow B, move back the staple support 6 during the downward movement of the driver.

The staple support 6 has a supporting body 17 in the center between the two surfaces, which projects into the interior of the annular eyelet and through which the annular eyelet 3 is supported against deformation when the staple 2 is driven in.

Figure 4A:
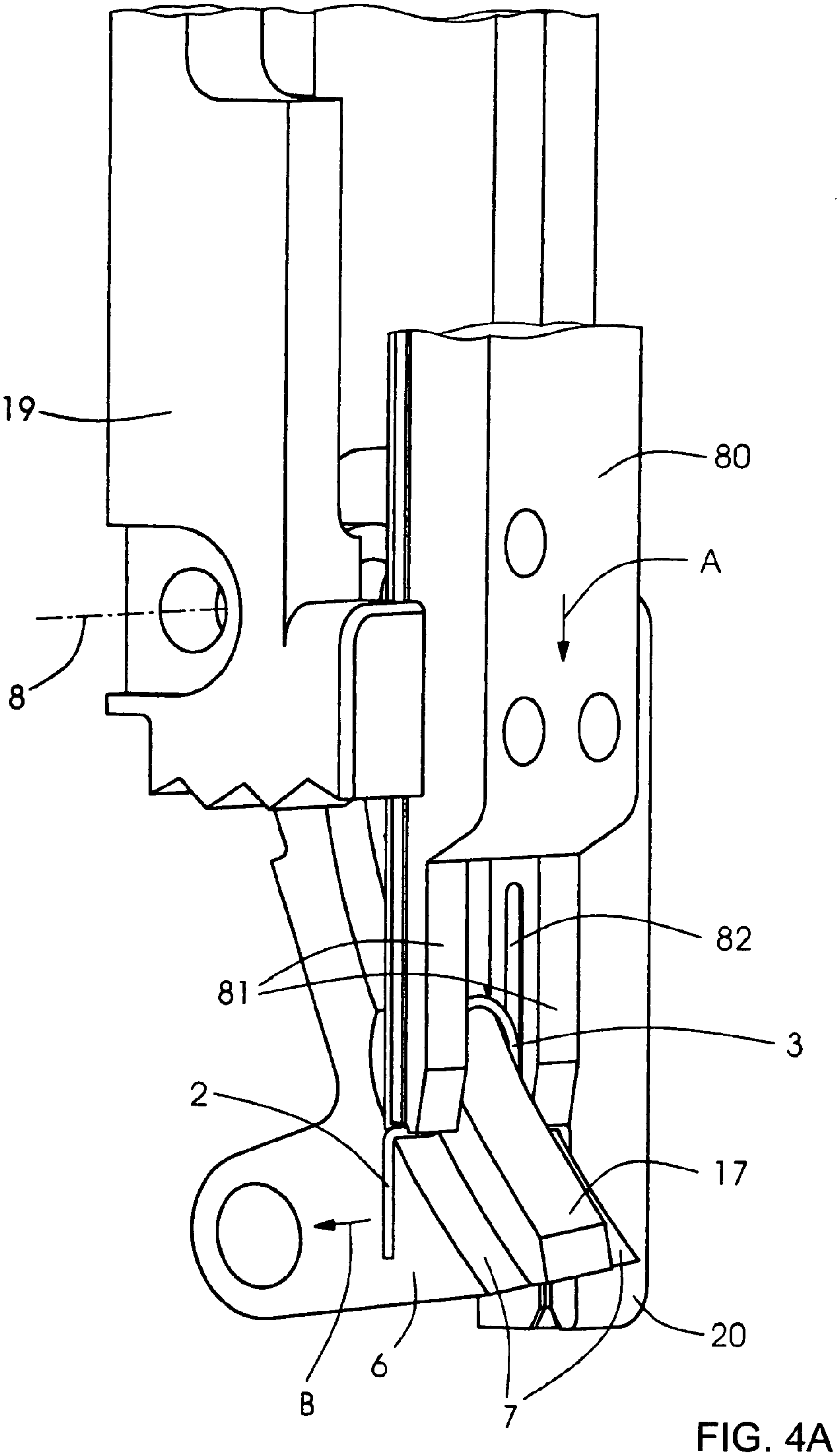
FIGS. 4A, 4B, 4C and 4D are simplified, fragmentary, perspective views of important components of the stitching head of FIGS. 2 and 3 as seen from different viewing directions and in different stages of a movement sequence for annular eyelet stitching.
Figure 4B:
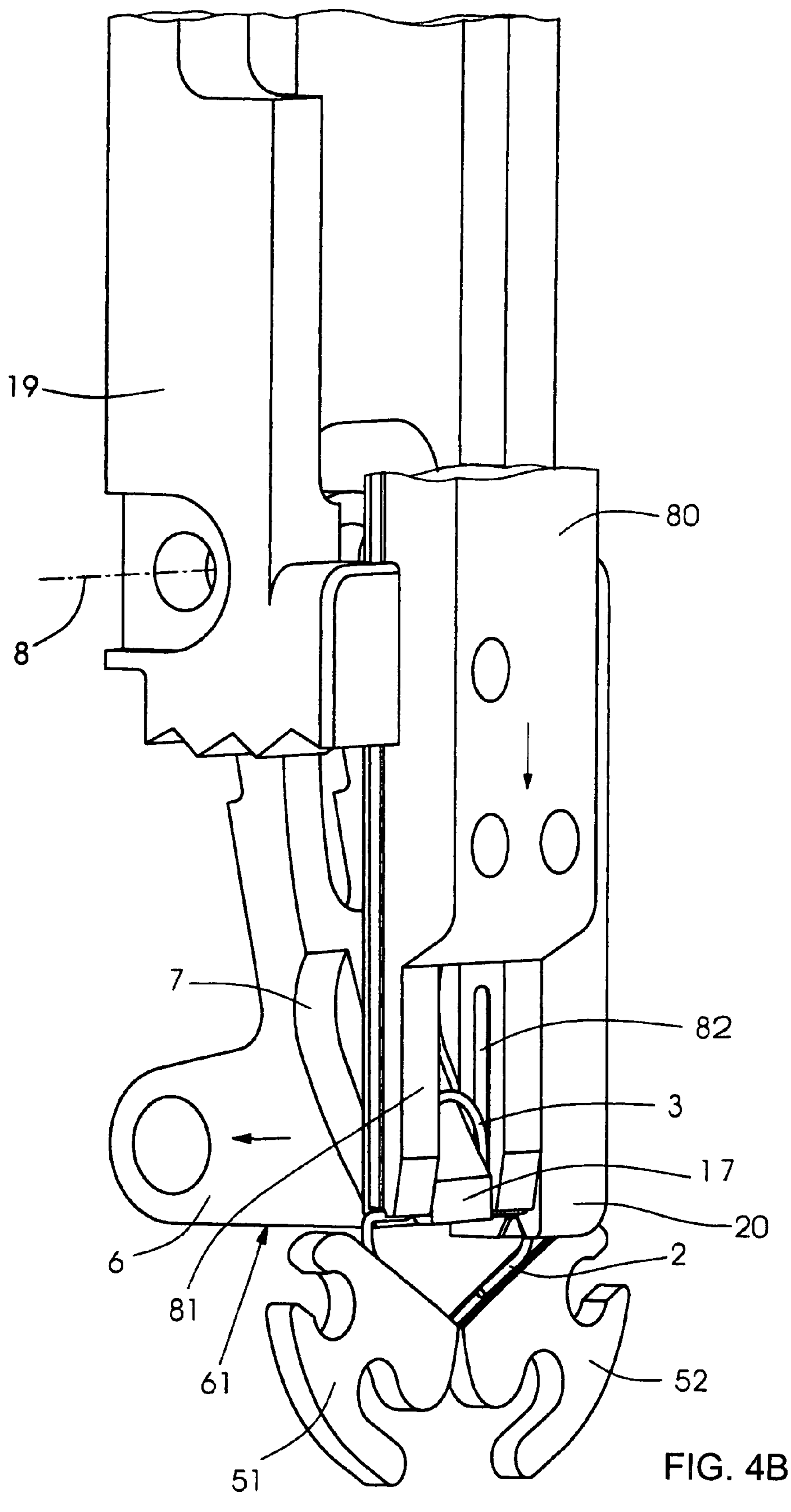

FIG. 4B shows the bottom of the stitching head during the second half of the downward movement of the slide 19, in which the latter has already moved downward to such an extent that a bending device 20 fastened thereon rests on the product which is to be stitched, and the two prongs 81 of the driver 80 have driven the legs of the annular eyelet 3 into the product which is to be stitched. The staple 2 is still guided laterally in this case, in the region of its legs, through outer surfaces of the staple support 6.

The driver 80 has almost reached the bottom dead center of the upward/downward movement of the driver slide 133 and, by having slid along the supporting or control curves or cams 7, has pushed the staple support 6 in the rearward direction. The bottom edges of the prongs 81 are located approximately level with a bottom surface 61 of the staple support 6, i.e. the annular-eyelet staple 2 has been driven more or less all the way in. Two pivotable clinchers 51 and 52 are located in a non-illustrated clincher box beneath the stack which is to be stitched. The clinchers 51, 52 have bent over the forced-through legs of the annular-eyelet staple to the extent where only a relatively low bending capacity is necessary thereafter until the bending-over operation has been completed. In the position described, the support body 17 is still located within the annular eyelet and secures the latter against collapse due to the still prevailing bending forces of the clinchers 51 and 52.

Figure 4C:
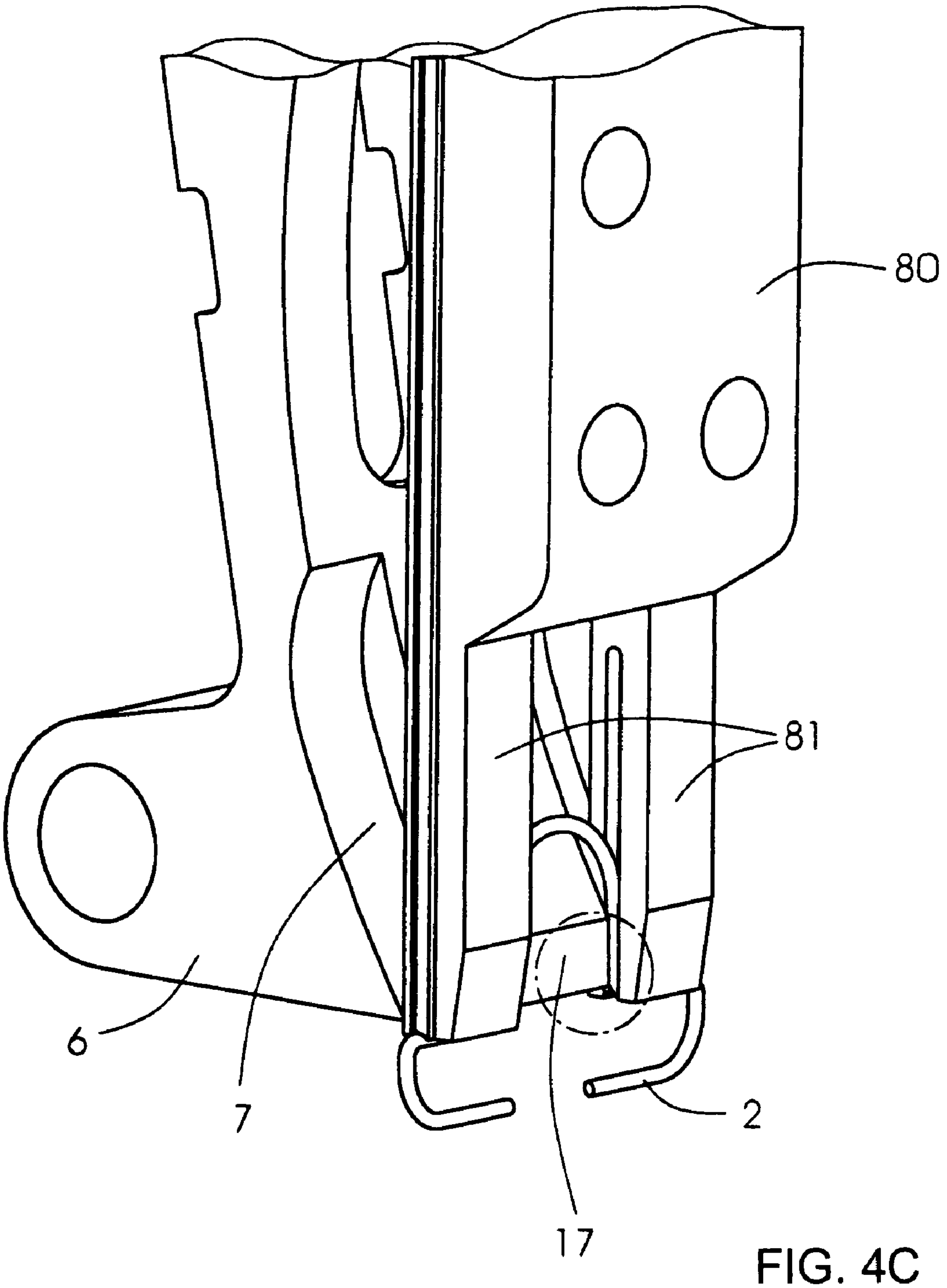
Figure 4D:
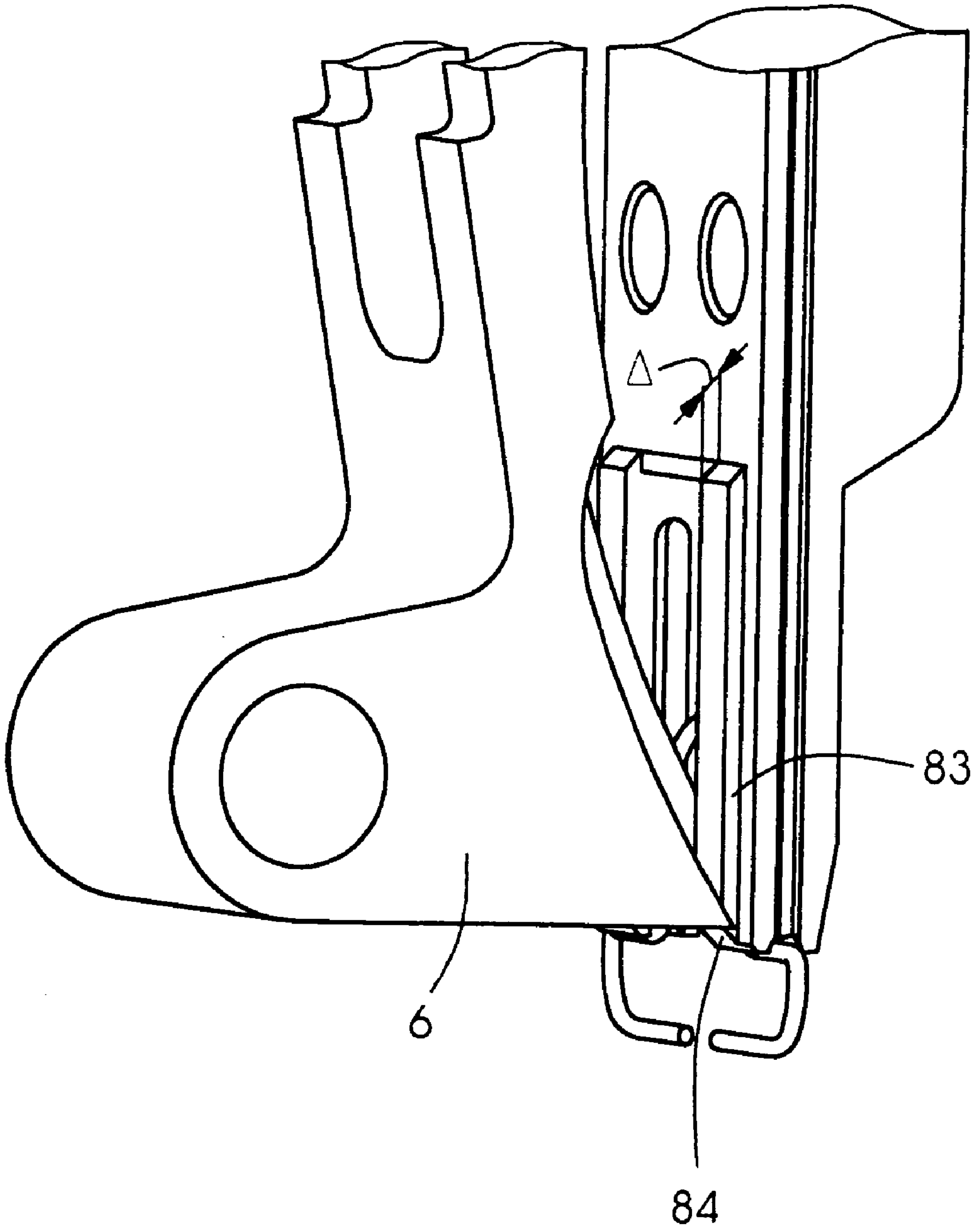
Figure 5:
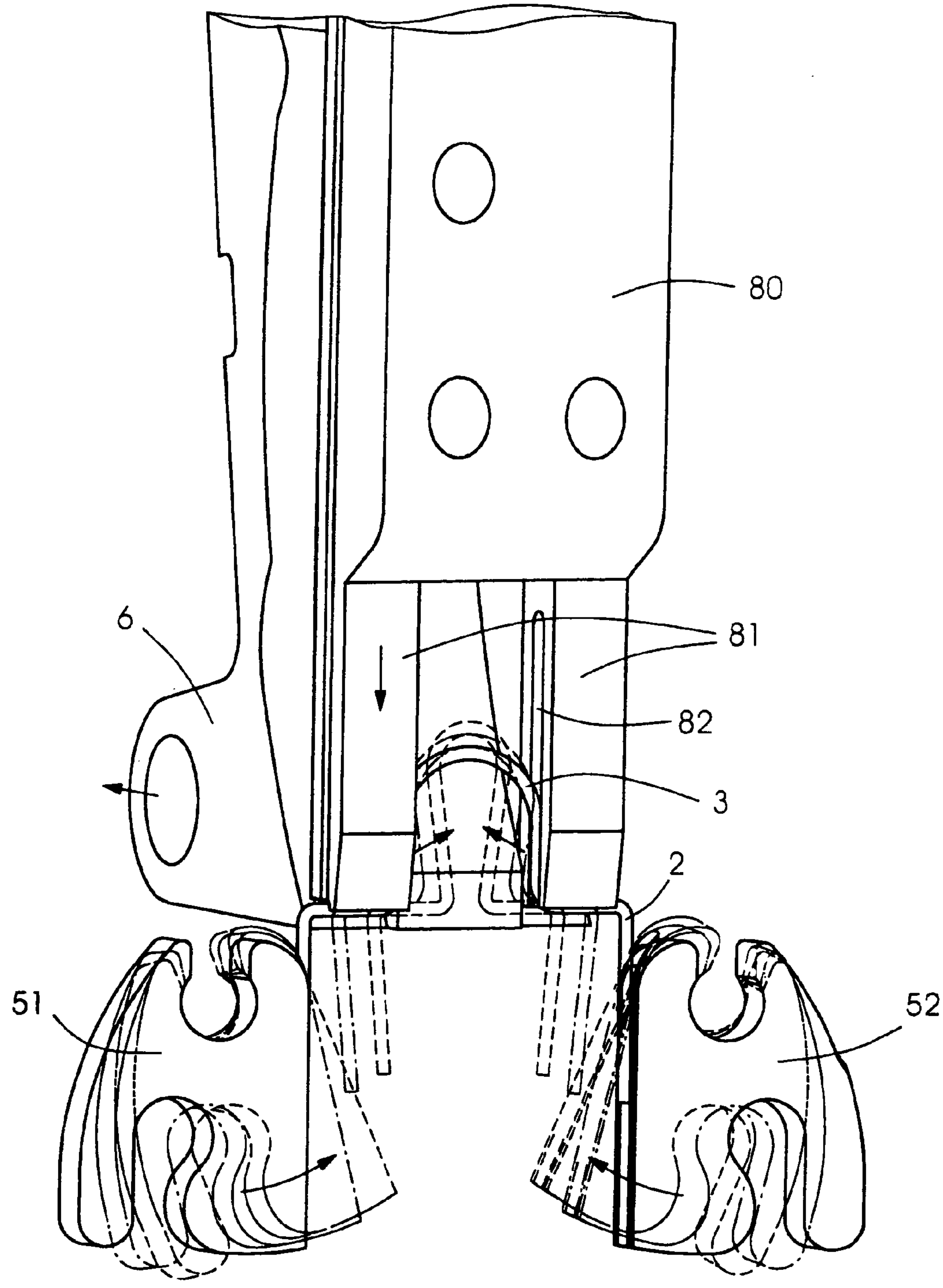
FIG. 5 is a fragmentary, perspective view illustrating a "collapse" of an unsupported annular eyelet as legs are bent over.

The driver 80 still has to cover just a relatively small distance of perhaps 0.5 to 1 mm, over which it forces the shoulders of the annular eyelet staples 2 onto the product which is to be stitched, until reaching the bottom dead center of the driver movement into a position according to FIG. 4C. During this movement, in the course of which the bottom edge of the driver 80 has already passed beneath the bottom edge 61 of the staple support, an additional cam takes effect, as is illustrated in FIG. 4D. This cam is fitted on the rear side of the driver 80, with a thickness Δ, and that part of the staple support 6 which tapers to a point is moved rearward again, by a bottom slope 84 of the cam, to the extent where the front side of the supporting body 17 leaves the annular eyelet 3 and releases the same, as is indicated in a dot-dash region in FIG. 4C. The precise point in time can be achieved by corresponding shaping of the slope 84 or control curve or cam 83 integrally formed on the prongs 81 of the driver 80. The annular-eyelet staple 2 is thus released by the supporting body 17 of the staple support 6 at a point in time at which the clinchers 51, 52 have bent over the staple legs to the extent where it is no longer possible for the shape of the annular eyelet 3 to be adversely affected by any bending stress. At this point in time, it is also the case that there is no longer any need for the stack which is to be stitched to act as a stabilizing element.

It is not absolutely necessary for the driver 80 to still cover a particularly significant distance in the direction of its bottom dead center in order to move the projecting supporting body 17 out of the region of the annular eyelet 3. Rather, it is also possible to configure the movement sequences of the slides 19, 133 in such a way that the flush positioning of the undersides of the driver 80 and bending device 20 and/or staple support 6 is achieved in the bottom dead center of the driver movement. If the slide 19 with the staple support 6 should then start its upward movement again immediately after this point in time, it is pivoted rearwards again along the slope 84 during its upward movement, and the supporting body 17 releases the annular eyelet 3 in the process.

Figure 6:
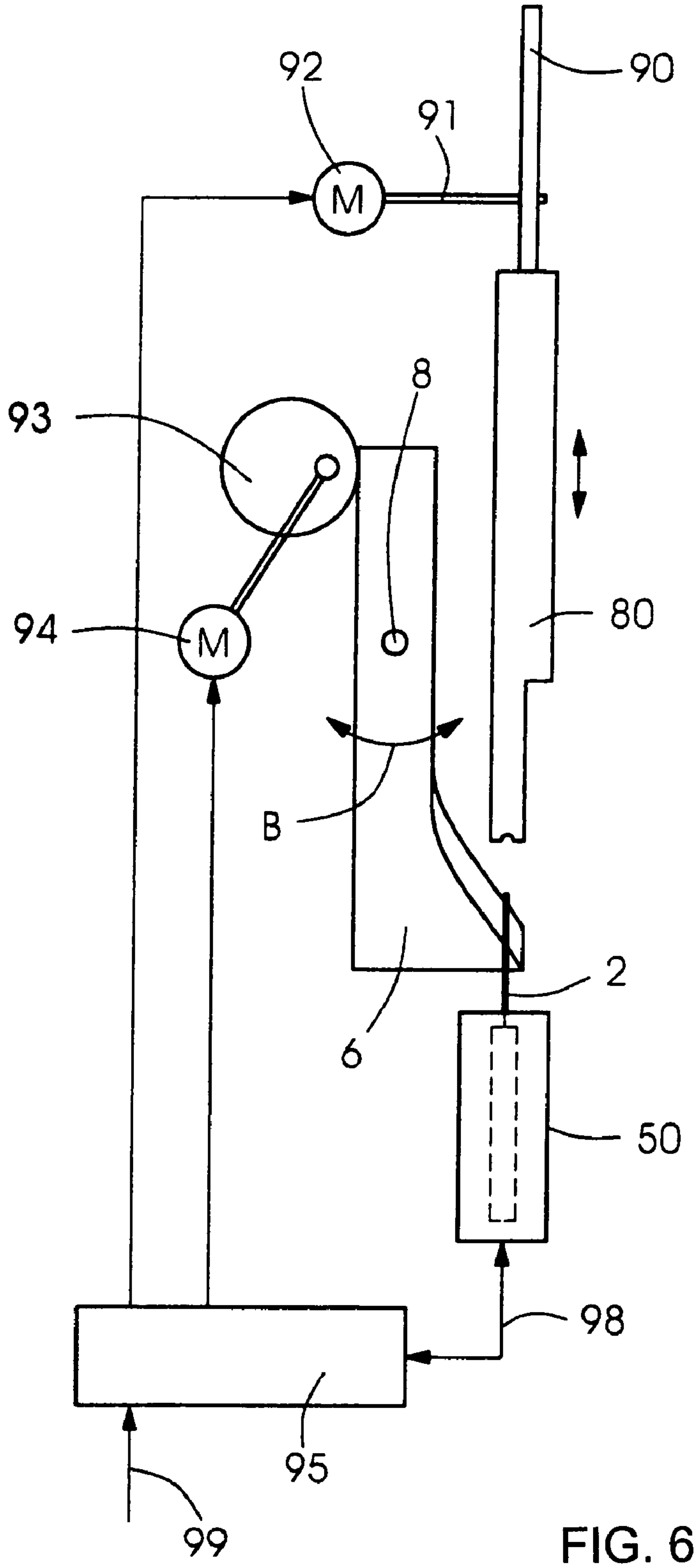
FIG. 6 is a simplified, partly perspective and partly block diagram of a further exemplary embodiment of the invention.

It is also possible to provide, for the pivoting movement of the staple support 6, a dedicated, separate drive which is independent of the movement of the stitching head relative to the wire stitcher and/or to the driver. It is thus possible for the staple support to be controlled independently of the downward movement of the driver slide 133, for example in coordination with the closing or bending movement of the clinchers 51, 52. This is outlined in FIG. 6, in which the back and forth movement of the driver 80 is brought about by an eccentric cam 90 which, for its part, is driven by a first motor 92, through a shaft 91. The staple support 6 can be pivoted about the axis 8, as is indicated by the arrow B, and is moved by a second motor 94, through a further eccentric cam 93. The two motors 92 and 94 are controlled by an electronic control unit 95 which, as is indicated by a signal input 99, is synchronized with the movement sequences in the gang stitcher 1. Furthermore, the control unit 95 is connected through a signal and control line 98 to a clincher box 50, which accommodates the clinchers 51 and 52 and non-illustrated drives for effecting the staple movement of the clinchers. The control unit 95 receives a control signal, through the signal line 98, at the point in time at which the clinchers 51, 52 have bent over the legs of the staple 2 to the extent where there are no longer any harmful transverse forces occurring. This signal serves to activate the motor 94, which moves the staple support 6 out of the staple through the eccentric cam 93.

The wire stitcher according to the invention can, of course, be used in a variety of different finishing apparatuses in the printing industry, not just in gang stitchers but, for example, also in finishing modules of copiers or digital printers. The wire stitcher can also be used in completely different sectors, e.g. in the wood-processing industry, e.g. for producing furniture, picture frames or the like.

We claim:

1. A wire stitcher, comprising:

a stitching head for stitching sheet-like materials using preferably annular-eyelet staples, said stitching head having a driver pressing onto shoulders of the staples and driving the staples into the sheet-like material;

a staple support for supporting the staples during a driving-in operation;

a bending configuration for bending over legs of the staples passing through the sheet-like material; and a drive for moving said staple support out of a region of the staple, said drive being configured and controlled for moving said staple support completely out of the region of the staple or of the annular eyelet, only once the legs of the staples passing through the sheet-like material have been largely bent over.

2. The wire stitcher according to claim 1, wherein said driver has a staple end, said staple support has a bottom end being located opposite the sheet-like material, and said drive is configured and controlled for causing said staple support, during a return movement of said staple support, to leave a supporting region of the annular eyelet only when said staple end of said driver has already passed beyond said bottom end of said staple support.

3. The wire stitcher according to claim 1, which further comprises a coupling for coupling movement between said bending configuration and said staple support.

4. The wire stitcher according to claim 1, wherein said drive for moving said staple support has a separate electric drive motor.

5. The wire stitcher according to claim 1, which further comprises a mechanical coupling between said driver and said staple support.

6. The wire stitcher according to claim 5, wherein said mechanical coupling between said driver and said staple support includes:

a first curve on said staple support, along which a side of said driver directed toward the staple slides in a region of the shoulders of the staple; and a second curve or cam on a rear side of said driver, interacting with said staple support.

7. The wire stitcher according to claim 6, wherein said first curve includes two partial curves.

8. The wire stitcher according to claim 6, wherein said second curve or cam is integrally formed on said rear side of said driver.

9. The wire stitcher according to claim 7, wherein said second curve or cam is integrally formed on said rear side of said driver.

* * * * *